United States Patent [19]

Yoneda et al.

[11] Patent Number: 5,191,538
[45] Date of Patent: Mar. 2, 1993

[54] APPARATUS FOR DISPLAYING OPERATION SEQUENCE OF NUMERICALLY CONTROLLED MACHINE TOOL

[75] Inventors: Takao Yoneda, Nagoya; Naoki Arimoto, Takahama; Takayuki Hotta, Nagoya, all of Japan

[73] Assignee: Toyoda Koki Kabushiki Kaisha, Kariya, Japan

[21] Appl. No.: 562,630

[22] Filed: Aug. 3, 1990

[30] Foreign Application Priority Data

Aug. 31, 1989 [JP] Japan .................. 1-226264

[51] Int. Cl.$^5$ ............................................. G06F 15/46
[52] U.S. Cl. .................. 364/474.16; 364/474.19; 364/474.22
[58] Field of Search ............ 364/474.16, 474.17, 364/474.19, 184, 185, 188, 189, 474.22; 371/29.1

[56] References Cited

U.S. PATENT DOCUMENTS

| | | | |
|---|---|---|---|
| 3,701,110 | 10/1972 | Tsugami | 364/474.16 |
| 4,263,647 | 4/1981 | Merrell et al. | 364/184 |
| 4,616,307 | 10/1986 | Kusumi et al. | 371/29.1 X |
| 4,653,108 | 3/1987 | Kranitzky | 364/474.25 X |
| 4,733,343 | 3/1988 | Yoneda et al. | 364/185 X |
| 4,815,014 | 3/1989 | Lipner et al. | 364/188 X |
| 4,858,102 | 8/1989 | Lovrenich | 364/474.16 X |

FOREIGN PATENT DOCUMENTS

| | | |
|---|---|---|
| 2906852 | 11/1979 | Fed. Rep. of Germany . |
| 3124809 | 1/1983 | Fed. Rep. of Germany . |
| 3344350 | 1/1985 | Fed. Rep. of Germany . |
| 63-99156 | 4/1988 | Japan . |

Primary Examiner—Joseph Ruggiero
Attorney, Agent, or Firm—Oblon, Spivak, McClelland, Maier & Neustadt

[57] ABSTRACT

An apparatus for displaying an operation sequence of a machine tool such as a grinding machine which is controlled by a numerical controller. During operation, successive operations instructed by a machine operator are stored in the memory of the numerical controller along with successive numerical commands which are executed during the successive operations. When a malfunction occurs in the machine tool, the storing operation is stopped, and the successive operations and the successive numerical commands executed before the occurrence of the malfunction are displayed on a display device for analyzing the cause of the malfunction.

4 Claims, 8 Drawing Sheets

FIG. 2

| No | OPERATION | |
|---|---|---|
| 01 | READY FOR RUN | |
| 02 | SELECTION OF MANUAL MODE | |
| 03 | HANDLE MANIPULATION | |
| 04 | SELECTION OF AUTOMATIC MODE | |
| 05 | SINGLE BLOCK MODE | |
| 06 | START | |
| 07 | START | |
| 08 | | |
| 09 | | OMF |
| ---- | ---- | |

FIG. 3

| No | No. OF OPE. | EXECUTED NC COMMAND |
|---|---|---|
| 01 | 3 | +200 |
| 02 | 6 | N100  20, 20 |
| 03 | 7 | N101  15, 10 |
| 04 | | |
| 05 | | |
| 06 | | |
| 07 | | |
| 08 | | DME |
| ---- | | ---- |

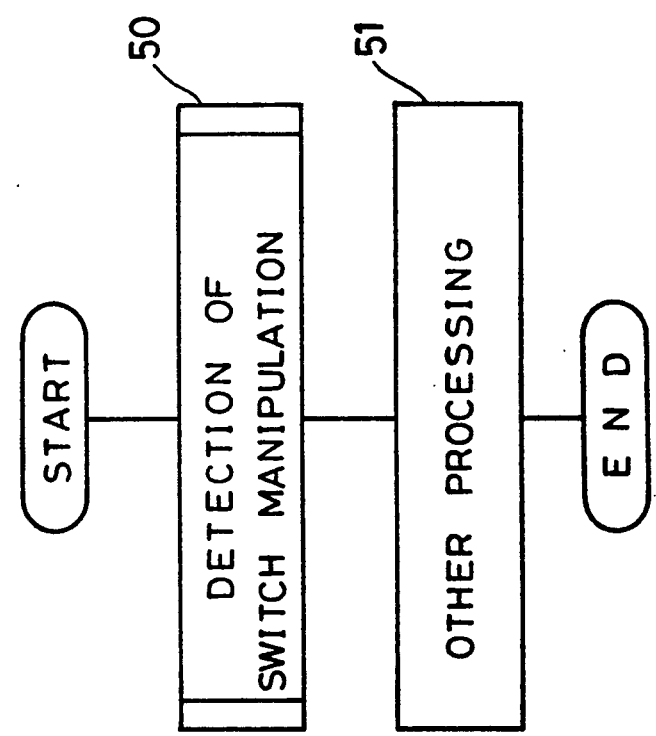

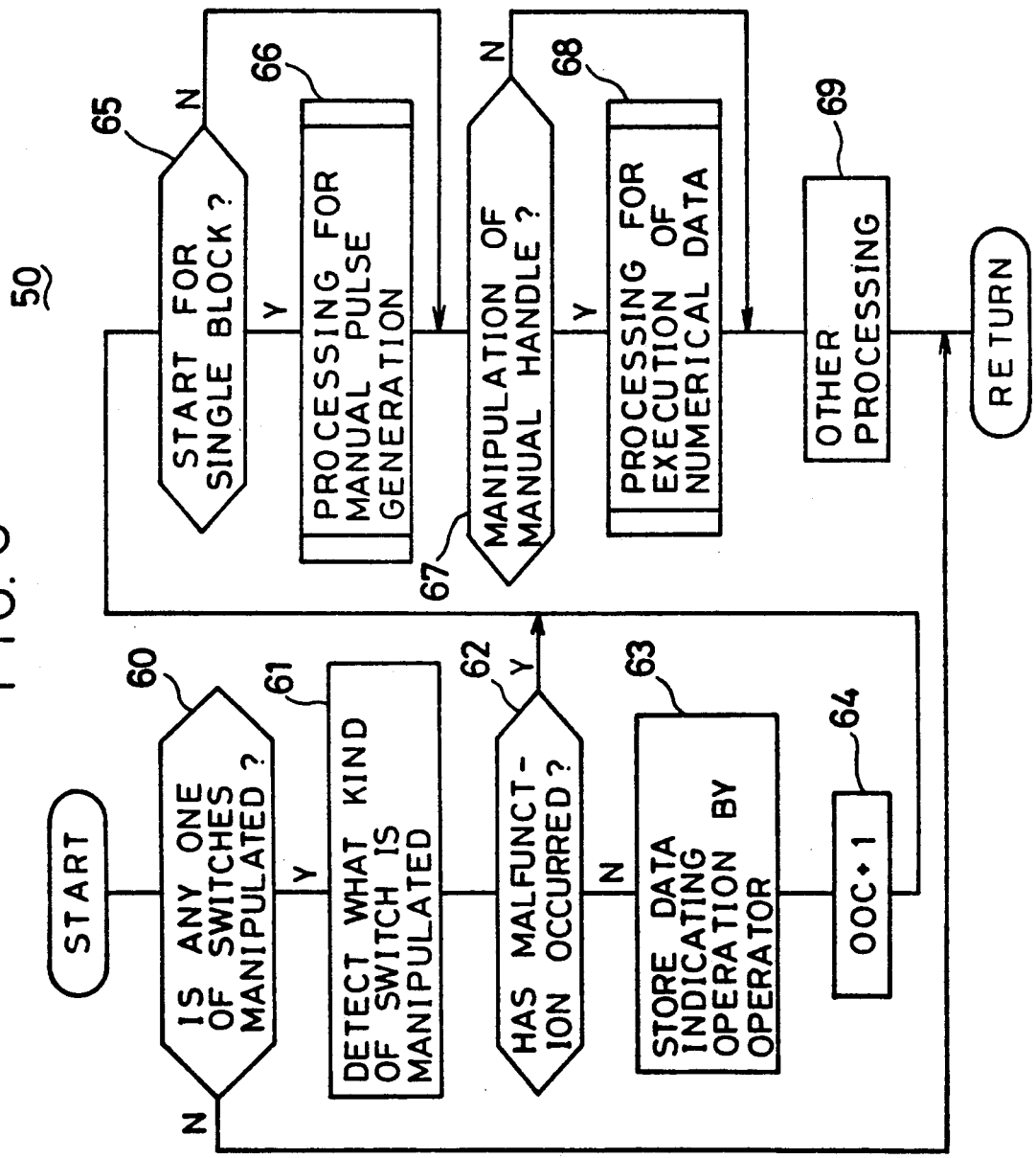

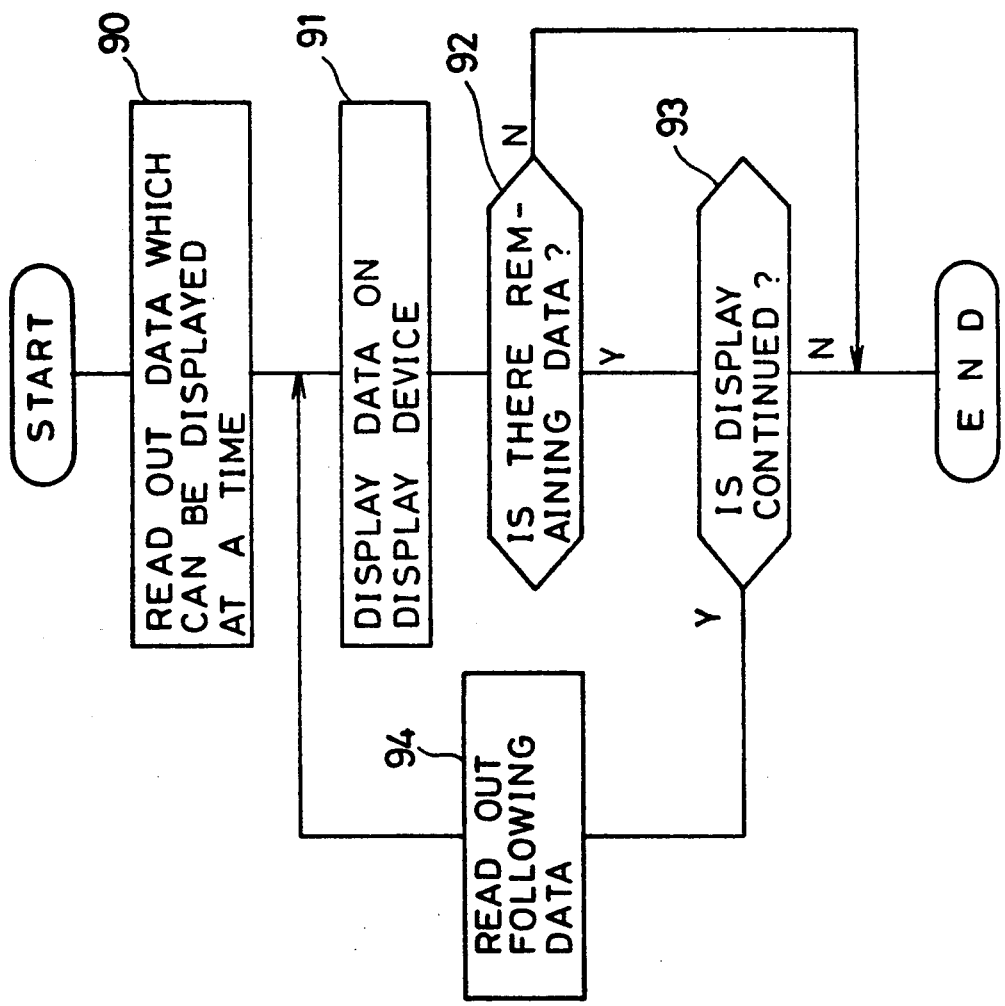

APPARATUS FOR DISPLAYING OPERATION SEQUENCE OF NUMERICALLY CONTROLLED MACHINE TOOL

BACKGROUND OF THE INVENTION

1. Field of the Invention

The present invention relates to an apparatus for displaying an operation sequence of a numerically controlled machine tool, wherein successive operations of the numerically controlled machine tool commanded by a machine operator are memorized during an operation and are displayed for malfunction analysis when the numerically controlled machine tool is stopped due to malfunction.

2. Discussion of the Prior Art

Heretofore, a numerical controller has been known which controls a machine tool in accordance with a numerical control program which is created based upon machining data input through a data input device. The prior numerical controller is provided with a function of displaying on a cathode-ray tube monitor information for monitoring the status of the machine tool. The monitor information is composed of a block number of a numerical control program which is being executed, a commanded moving amount of a movable element of the machine tool, the present position of the movable element, and the remainder of the commanded moving amount and the like. The displayed monitor information is updated when the numerical control program is executed in the automatic operation mode, or the manual feed handle for generating manual feed pulses is rotated by a machine operator in the manual operation mode. In the event that the machine tool stops because of a malfunction, the machine operator can know the status of the machine tool based upon the displayed information.

Since the displayed information just indicates the present status of the machine too, and such information disappears if the operation of the machine tool is continued after the occurrence of the malfunction, it is difficult to analyze the cause of the malfunction based upon the displayed information.

To analyze the cause of a malfunction, it is required to know the operation sequence of the machine tool, i.e., successive operations which the machine operator instructed the numerical controller before the occurrence of the malfunction, as well as the monitor information as described above. The prior numerical controller, however, just monitors the execution of the numerical control program as explained above, but does not memorize the operation sequence. The machine operator therefore has to remember the successive operations to analyze the cause of the malfunction. Since it is difficult for the machine operator to precisely memorize the operation sequence, the malfunction analysis based on the operator's memory is inefficient. Further, it is difficult to revive the malfunction, because the operation sequence is not memorized accurately.

SUMMARY OF THE INVENTION

Accordingly, it is a primary object of the present invention to provide an improved apparatus for displaying an operation sequence of a numerical controlled machine tool, which is capable of memorizing data indicating successive operations of the numerically controlled machine tool and displaying the successive operations based upon the memorized data when a malfunction occurs, thereby easing malfunction analysis.

An additional object of the present invention is to provide an improved apparatus of the character set forth above capable of memorizing data indicating successive numerical commands which is executed by a numerical controller controlling the machine tool, as well as the successive operations, and displaying the successive executed numerical commands together with the memorized successive operations.

Briefly, the present invention provides an apparatus for displaying an operation sequence of a machine tool which is controlled in accordance with a numerical control program. The apparatus comprises operation memory means for memorizing data indicating successive operations, memory control means for storing into the operation memory means data indicating successive operations instructed by an operator through command switches, stopping means for stopping the operation of the memory control means when a malfunction occurs, and display control means for displaying on a display device information indicating the successive operations based upon the data stored in the operation memory means.

With this configuration, the operator can know the operation sequence of the machine tool before a malfunction has occurred.

In another aspect of the present invention, numerical command memory means and additional memory control means are further provided for memorizing successive numerical commands which are executed during the successive operations before the occurrence of the malfunction, and the display control means is capable of displaying the numerical commands together with the memorized successive operations.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 2 is a chart illustrating an operation sequence memory area formed in the memory of the numerical controller shown in FIG. 1;

FIG. 3 is a chart illustrating a numerical command memory area formed in the memory of the numerical controller shown in FIG. 1;

FIGS. 4 through 8 are flow charts illustrating the operation of the CPU of the numerical controller;

DETAILED DESCRIPTION OF THE PREFERRED EMBODIMENT

Figure 1:
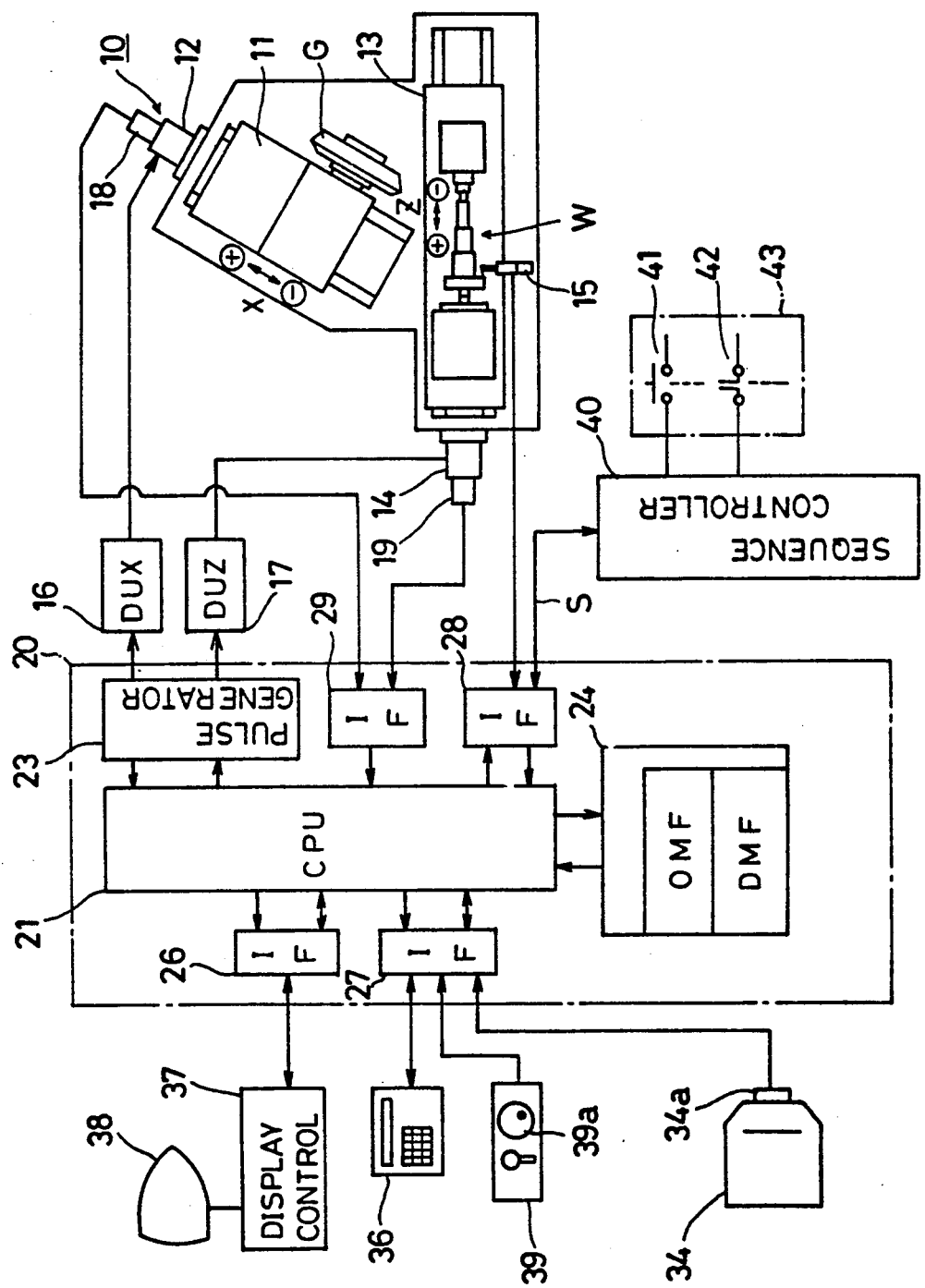
FIG. 1 is a top plan view of a grinding machine with a block diagram of a numerical controller including an operation sequence displaying apparatus according to the present invention.

Referring now to the drawings and particularly, to FIG. 1 thereof, reference numeral 10 denotes an angular type grinding machine 10 is provided with a wheel head 11 supporting grinding machine 10 is provided with a wheel head 11 supporting a grinding wheel G and a workpiece table 13 on which a workpiece W is supported.

The wheel head 11 and the workpiece table 13 are moved by the servomotors 12 and 14 which are controlled by drive circuits 16 and 17, respectively. Absolute encoders 18 and 19 are connected to the servomotors 12 and 14, respectively, so as to detect the rotational positions thereof. The absolute encoders 18 and 19 are connected to the CPU 21 of a numerical controller 20 through an interface circuit 29 in order to lead the output signals of the encoders 18 and 19 to the CPU 21. Reference numeral 15 denotes a measuring device for positioning the workpiece W at a predetermined axial position.

Connected to the CPU 21 are a memory 24, a pulse generator 23 and interface circuits 26, 27, 28 and 29. The pulse generator 23 is connected to the drive circuits 16 and 17 to output command pulses thereto. Connected to the interface circuit 26 is a display control circuit 37 to which a display device 38, such as a cathode-ray tube is connected. Also, connected to the interface circuit 27 are a data input panel 36, a manual pulse generator 39 having a manual handle 39a, and a connector 34a to which a cassette type bubble-memory 34 for memorizing numerical control program is attached.

Further, a sequence controller 40 is connected to the CPU 21 through the interface circuit 28. Plural switches arranged on an operation panel 43 are connected to the sequence controller 40. The switches are composed of button type command switches 41 for commanding to start various operations, such as "START", "RETRACTION OF TABLE TO ORIGIN", and rotary type and toggle type selector switches 42, such as a mode switch selecting one of various operation mode. The sequence controller 40 controls the overall operation of the grinding machine 10 in response to operation commands input by a machine operator through the above-mentioned switches 41 and 42. Switch data indicating the status of the switches 41 and 42 and other data indicating the control status of the grinding machine 10 are output to the CPU 21 of the numerical controller 20 so that the CPU 21 is able to detect the status of the switches 41 and 42, and the operation status of the grinding machine 10.

The memory 24 is provided with an operation sequence memory area OMF and a numerical command memory area DMF. The operation sequence memory area OMF stores successive operation data, as shown in FIG. 2, which indicate the manipulations of the command switches 41, selector switches 42 and manual pulse generator 39 by the operator. On the other hand, the numerical as shown in FIG. 3, which are manually input through the manual pulse generator 39 or executed in accordance with a numerical control program stored in a program memory area (not shown) formed in the memory 24.

The operation of the CPU 21 of the numerical controller 20 will be explained hereinafter with reference to the flow charts shown in FIGS. 4 through 8 and explanatory charts shown in FIGS. 9 and 10.

Figure 9:
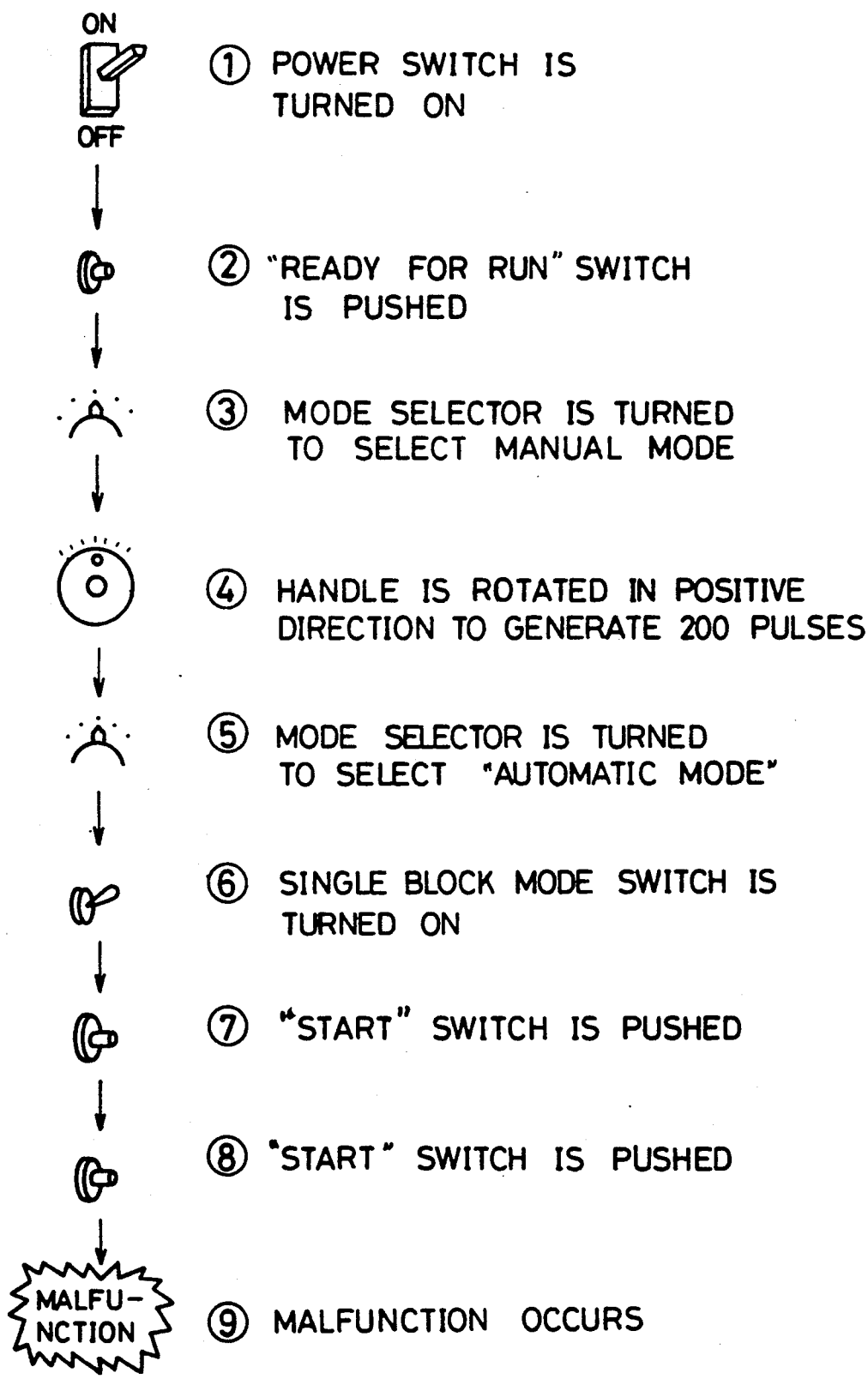
FIG. 9 is an explanatory chart illustrating successive operations commanded by a machine operator.
Figure 10:
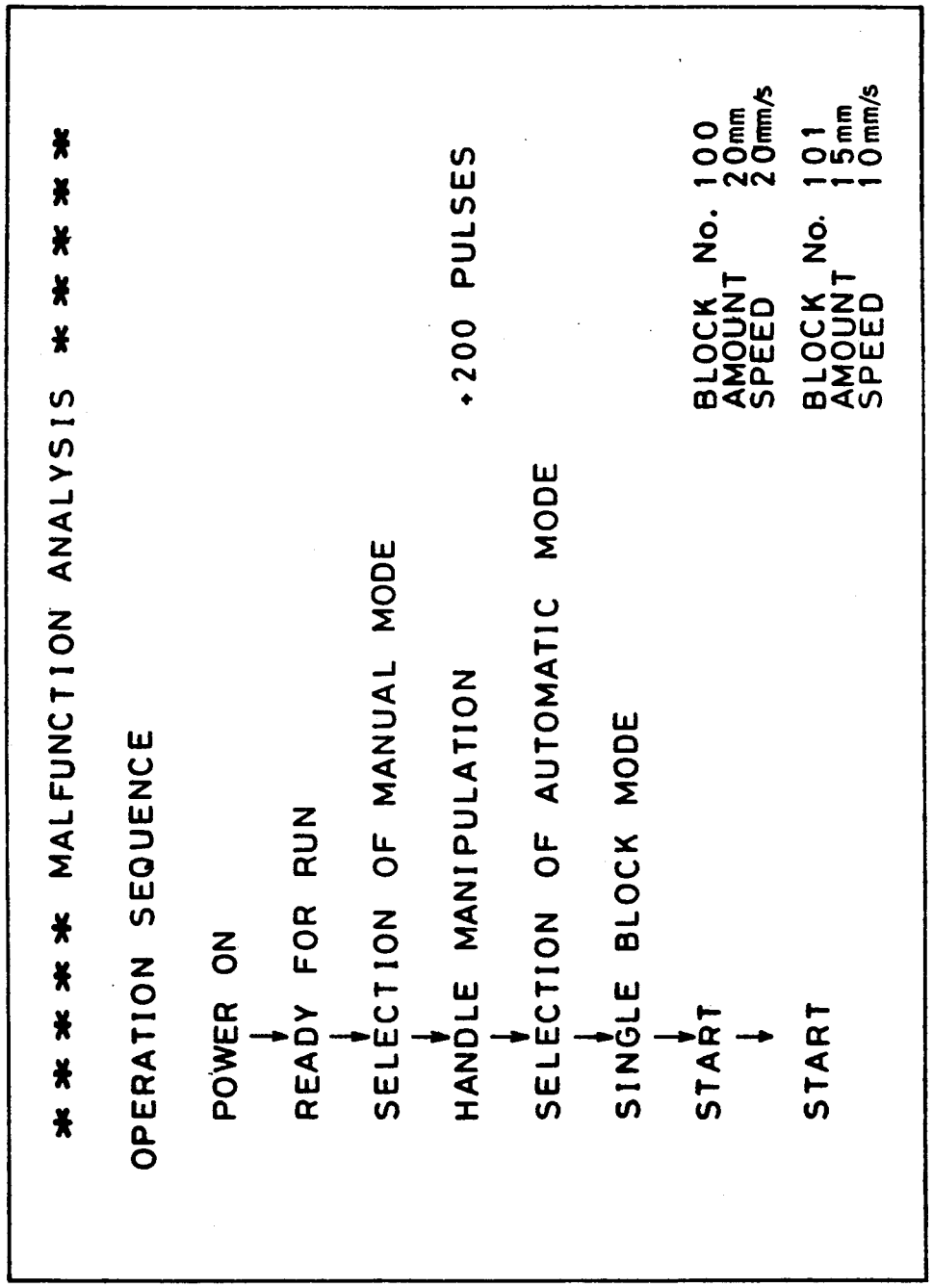
FIG. 10 is a chart illustrating the display screen of the display device on which successive commanded operations and successive executed numerical commands are displayed.

The chart shown FIG. 9 illustrates an example of successive operations by the operator, wherein a command switch for "READY FOR RUN" is pushed after the power switch has been turned on, and then the mode selector is turned to select the "MANUAL MODE". After that, the manual handle 39a of the manual pulse generator 39 is rotated in its positive direction to generate command pulses of two hundreds. Thereafter, the mode selector is again turned to select the "AUTOMATIC MODE", and the single block mode switch is turned on to set the numerical control mode of the numerical controller 21 to the "SINGLE BLOCK MODE". Then, a command switch "START" is actuated by the operator for instructing the numerical controller 21 to execute one data block of the numerical control program. In this instance, a malfunction occurs after two data blocks of the numerical control program has been executed in the "SINGLE MODE".

The CPU 21 of the numerical controller 20 monitors the status of switches 41 and 42 and the manual handle 39a of the manual pulse generator 39 at step 50 of a base routine shown in FIG. 4 which is executed at a predetermined time interval. The flow chart shown in FIG. 5 illustrates in detail the processing at the step 50 and it is judged whether or not any one of the switches and manual handle is manipulated by the operator, at step 60 thereof.

If it is judged that one of the switches and operation handle is manipulated, the processing of the CPU 21 moves to step 61 to judge which one of the switches or manual handle is manipulated by the operator. After that, the CPU 21 judges at step 62 whether or not a malfunction occurs. If it is judged that no malfunction occurs, the processing of the CPU 21 moves step 63 to store into the operation sequence memory area OMF data indicating the operation instructed by the operator, and increments the counter OOC which designates the memory address within the operation sequence memory area OMF, at step 64. In the case that a malfunction occurs in the grinding machine 10, the CPU 21 moves from step 62 to step 65 without executing the processing at steps 63 and 64. The CPU 21 then executes processing corresponding to the operation instructed by the operator, at steps 65 through 69.

Since the counter OOC is initially set to one, data indicating the actuation of "READY FOR RUN" switch is stored in the first memory address of the memory area OMF, as shown in FIG. 2. Then, the data indicating the rotation of the mode switch to MANUAL MODE is stored in the second memory address of the memory area OMF. Similarly, the successive operations by the operator are memorized sequentially into the successive memory addresses of the memory area OMF.

Further, when the operator instructs the numerical controller 20 to execute the numerical control program, or manipulates the manual handle 39a of the manual pulse generator 39, the CPU 21 stores into the numerical command memory area DMF data indicating the execution of the numerical control program or the manual pulse generation.

Figure 6:
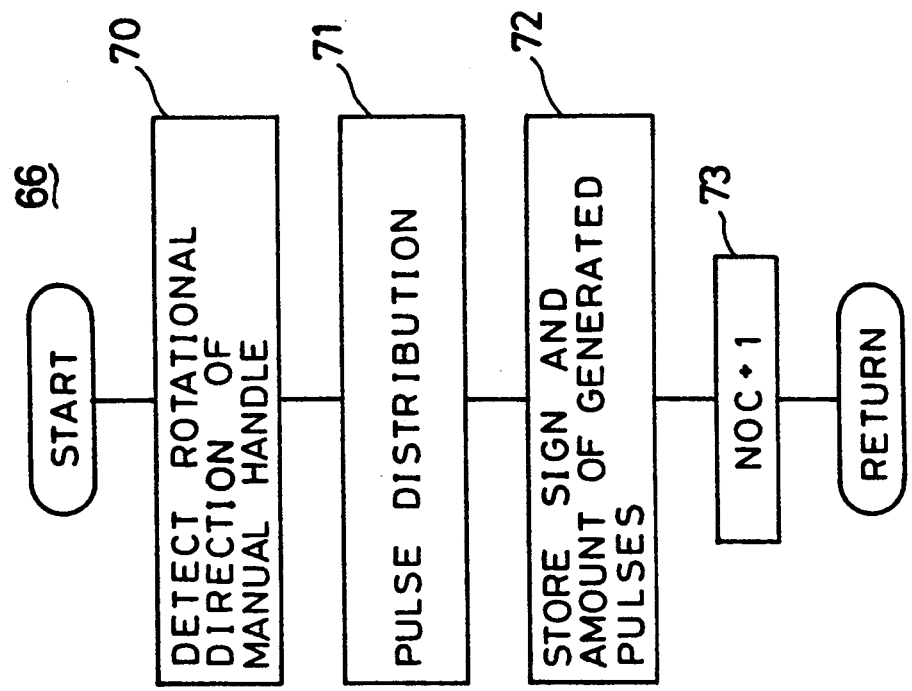

Namely, when the manual handle 39a of the manual pulse generator 39 is manipulated by the operator, the processing of the CPU 21 moves from step 64 to step 68 via steps 65 and 67 for manual pulse generation, whose detailed processing is shown in FIG. 6. Namely, the CPU 21 detects the direction of rotation of the manual handle 39a of the manual pulse generator 39, at step 70, and then moves to step 71 to generate positive or negative command pulses through the pulse generator 23. The number of the generated pulses is proportional to the amount of rotation of the manual handle 39a. At the next step 72, the CPU 21 stores into the memory area DMF data indicating the sign and number of the generated pulses together with data indicating the present operation number designated by the counter OOC. Since a counter NOC designating the memory address within the memory area DMF is initially set to one, the above data is stored into the first memory address of the memory area DMF, as shown in FIG. 3. At step 73, the CPU 21 increments the counter NOC by one.

Figure 7:
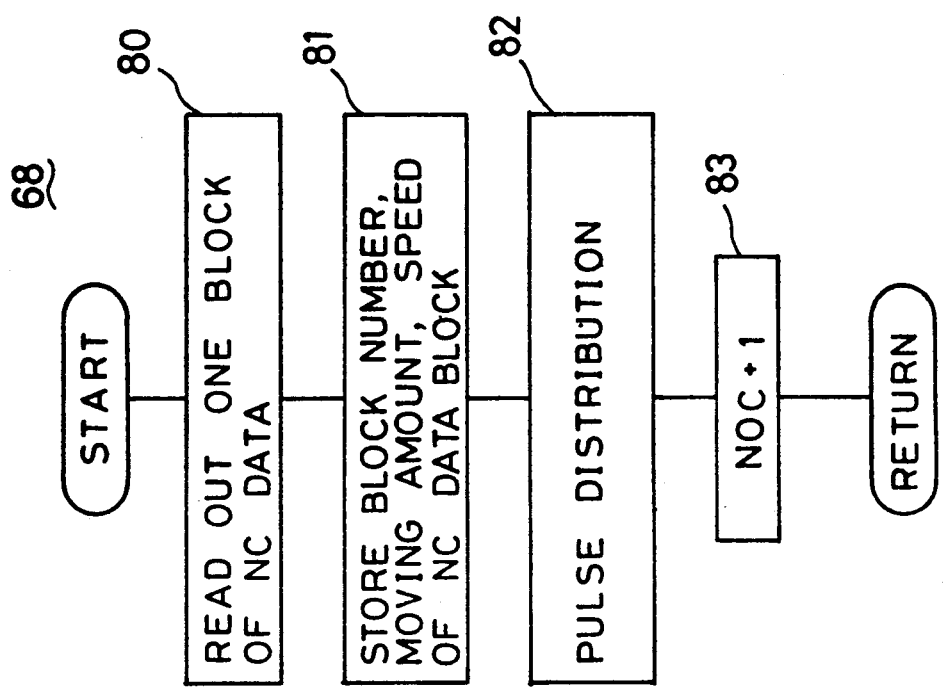

Also, when the "START" switch is actuated by the operator in the single block mode, the processing of the CPU 21 moves from step 65 to step 66 for block by block execution of the numerical control program, whose detailed processing is shown in FIG. 7. Namely, the CPU 21 reads out one block of numerical control data from the memory 24, at step 80. At the next step 81, the CPU 21 stores the memory area DMF data indicating the block number, commanded movement amount, commanded speed of the read out numerical control data. After that, the CPU 21 instructs the pulse generator 23, at step 82, to distribute command pulses to the drive circuit 16 or 17 at a speed corresponding to the commanded speed until commanded number of pulses are distributed. At step 83, the CPU 21 increments the counter NOC by one.

Since the processing at the steps 80 through 85 is repeated whenever the "START" switch is actuated by the operator, the numerical control data read out from the memory 24 are stored in successive memory addresses of the memory area DMF, as shown in FIG. 3.

When a malfunction occurs in the grinding machine 10 or in the sequence controller during such successive operations, a signal indicating the occurrence of the malfunction is transmitted to the CPU 21 of the numerical controller 20, so that the CPU 21 stops the operation of the grinding machine 10 and moves to an idle condition wherein the CPU 21 waits a new command input through the data input panel 36.

When the operator pushes keys in a predetermined way during such idle condition, the CPU 21 executes the displaying processing shown in FIG. 8. At first step 90, the CPU 21 reads out from the memory areas OMF and DMF predetermined amount of data which can be displayed on the cathode-ray tube at a time. At next step 91, the data read out from the memory area OMF and indicating the successive operations by the operator are displayed on the cathode-ray tube together with the data read out from the memory area DMF and indicating the successive execution of numerical commands, as shown in FIG. 10. As is understood from FIG. 10, the executed numerical commands are displayed at vertical positions corresponding to positions whereat operation commands for numerical control, i.e., "HANDLE MANIPULATION" and "START" are displayed. Since the data stored in the memory areas OMF and DMF can be displayed on the cathode-ray tube at a time in this instance, the processing of the CPU 21 ends at step 92. On the contrary, when the data stored in the memory areas OMF and DMF cannot be displayed on the cathode-ray tube at a time, the processing of the CPU 21 moves from the step 92 to step 93 to judges whether or not the operator instructs to display the remainder of the data. If the operator instructs to display the remainder of the data, the processing of the CPU 21 moves from step 93 to step 94 to read out following data which can be displayed at a time and then moves to step 91 to display the following data.

The operator can accurately know the successive operations and the successive numerical commands executed during the successive operations before the occurrence of the malfunction. This eases the analysis of cause of the malfunction. If it is found from the displayed information that the switches are actuated in incorrect order, the cause of the malfunction may be the incorrect operation by the operator. If it is found from the displayed information that the switches are actuated in correct order, the cause of the malfunction may be a malfunction in the grinding machine 10.

Although all of successive operations after the start-up of the grinding machine are memorized in the memory area, it can be modified such that oldest data memorized in the memory area is automatically deleted, when all of the memory address of the memory area are occupied by data, for following memorizing operation.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for displaying an operation sequence of a machine tool which is controlled by a numerical controller in accordance with a numerical control program, said apparatus comprising:
    operation memory means for memorizing data indicating successive operations;
    numerical command memory means for memorizing data indicating successive numerical commands;
    first memory control means for storing into said operation memory means data indicating successive operations instructed by an operator through command switches;
    second memory control means for storing into said numerical command memory means data indicating successive numerical commands, which are commanded by a manual operation or by the numerical control program during the successive operations;
    stopping means for stopping the operations of said first memory control means and said second memory control means when a malfunction occurs, and
    display control means for displaying on a display device information indicating the successive operations together with the executed successive numerical commands based upon the data stored in said operation memory means and said numerical command memory means.

2. An apparatus as set forth in claim 1, wherein said first memory control means stores into said operation memory means names of switches manipulated by the operator.

3. An apparatus as set forth in claim 2, wherein said second memory control means stores into said numerical command memory means the number of pulses generated by a manual pulse generator when said manual pulse generator is manipulated by the operator, and stores the block number, commanded moving amount and commanded moving speed programmed in the successive data blocks of the numerical control program when the numerical control program is executed.

4. An apparatus as set forth in claim 3, wherein said display device comprises a cathode-ray tube on which the information is displayed.

* * * * *